United States Patent Office 3,790,571
Patented Feb. 5, 1974

3,790,571
PHENYLPYRIDAZINES
Alfred Diskus, Linz (Danube), Rupert Schonbeck, Leonding, near Linz (Danube), Engelbert Klomstein, Eferding, and Hubert Mayr, Leonding, near Linz (Danube), Austria, assignors to Osterreichische Stickstoffwerke Aktiengesellschaft, Linz (Danube), Austria
No Drawing. Filed June 9, 1972, Ser. No. 261,331
Claims priority, application Germany, June 11, 1971,
P 21 29 109.8
Int. Cl. C07d 51/04
U.S. Cl. 260—250 A            5 Claims

ABSTRACT OF THE DISCLOSURE

Phenylpyridazine compounds having the general formula:

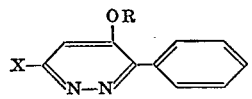

in which X is Cl or Br and R is H, —CH₃ or —CH₃CO, a process for their preparation and herbicidal compositions containing them.

---

This invention relates to phenylpyridazine compounds, a process for the preparation thereof and herbicidal compositions containing them.

It has been known for some time that various pyridazine derivatives influence plant growth. Thus pyridazines which contain two or three halogen atoms or up to two halogen atoms and additionally alkylated amino groups, alkoxy groups or alkylmercapto groups have been proposed as agents for influencing plant growth, see Austrian Pat. No. 198,997.

It is furthermore known from U.S. patent specification No. 3,010,962 that 3-chloropyridazine-6-oxyacetic acid is a hormonally-active agent for combating weeds which is suitable for combating types of weeds which are resistant to 2,4-dichloro-phenoxy-acetic acid. Also the herbicidal action of 3,6-dichloro-4-hydroxypyridazine is known from Austrian patent specification No. 237,962.

It has now been found that previously unknown phenylpyridazine compounds possess very good herbicidal properties and furthermore show good toleration by many crop plants, for example grain.

Accordingly, the present invention provides a phenylpyridazine compound having the general formula:

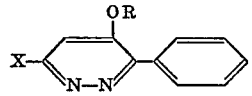

(I)

in which X is a chlorine or bromine atom and R is a hydrogen atom or the CH₃— or CH₃CO— group.

The invention also provides a process for the preparation of phenylpyridazine compounds having the General Formula I herein, which comprises reacting a compound of the general formula:

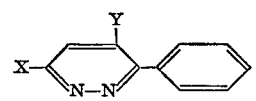

(II)

in which X is as defined above and Y is a chlorine or bromine atom, with a compound of the general formula MeOR₁                                  (III)

in which Me is an alkali metal or the equivalent of an alkaline earth metal and R₁ represents a hydrogen atom or the CH₂— group, after which, when R in Formula I is the CH₃CO— group, the latter is introduced by acetylation in a conventional manner.

The reaction, according to the invention, of a 3-phenyl-4,6-dihalopyridazine of Formula II with a compound of Formula III may be carried out in an aqueous medium, e.g. water alone, or in an organic solvent, such as, for example, an alcohol, especially a lower aliphatic alcohol. In the case of the introduction of a methoxy group, it is particularly advisable to use methanol as the solvent. The reaction will occur at normal ambient temperature but may be accelerated by the use of a higher temperature, for example 50° to 100° C. Appropriately, it is carried out at the boiling point of the particular solvent used.

Suitable compounds of the Formula III are most preferably the hydroxides and methylates of the alkali metals, especially of sodium and of potassium. Calcium hydroxide may be particularly mentioned as an alkaline earth compound.

When using alkali metal hydroxides, those of maximally 10% by weight concentration are preferably chosen. In that case it is not necessary to fear that the halogen atom in position 6 might be attacked, even when using an elevated temperature and even if an excess of alkali metal hydroxide is present. If alkali metal hydroxides of a higher concentration are used, they should only be employed in equivalent amount. Analogous statements are true regarding the reaction with alkali metal alcoholates.

In the case of hydroxy compounds being manufactured, the reaction mixture is worked up by acidification, as a result of which the free hydroxy compounds precipitate as insoluble finely crystalline solids, and filtering off.

Purification may be effected by recrystallization from a suitable solvent.

In the case of the manufacture of the 4-methoxy compound of the Formula I, working up takes place by dilution with water and filtering off the precipitate.

Acetic anhydride or acetyl chloride is advantageously used for the acetylation of the 4-hydroxy compound of the Formula I. However, any other known method of acetylation is also usable.

The starting substances for the preparation of the compounds according to the invention may be obtained in a simple manner by reaction of 3-phenyl-4-chloro-pyridazone-(6) of the formula:

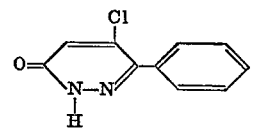

(IV)

with a phosphorus halide or a phosphorus oxyhalide, for example phosphorus oxychloride or phosphorus oxybromide, in accordance with the known process.

The present invention further provides a herbicidal composition for the selective combating of weeds in crop plantings, which comprises, as the active ingredient, one or more phenylpyridazine compounds of Formula I herein in admixture with a carrier.

The herbicidal compositions according to the invention may be in the form of a dispersion, an emulsion, a pulverulent preparation or in the form of granules. At the same time, admixture with other herbicidally active substances is of course possible, and conjoint application with insecticides, growth regulators or plant nutrients has also proved successful. In the case of compositions in the form of aqueous dispersions or emulsions it is advisable to add a dispersing agent or wetting agent such as, for example, sodium oleyl-methyl-tauride. Possible solid carriers or extenders are, amongst others, various types of clay, for example kaolin.

It is advantageous to combine the compounds according to the invention with a non-phytotoxic oil, for example a mineral oil-emulsifier mixture, consisting of a paraffinic mineral oil and an emulsifier. The herbicidal action may be increased yet further by addition of such a "spray oil" to a spraying solution of a compound according to the invention. Such combinations usually contain 1 to 10 kg. of the active compound according to the present invention and 1 to 10 litres of a non-phytotoxic oil, distributed in an amount of 50 to 1,000 litres of water.

The active compounds according to the invention are foliage herbicides, the action of which is independent of both the soil characteristics and the soil moisture. It is also hardly dependent on the external temperature. Since these compounds are not active in the sense of growth substances, the danger of damage to adjacent crops is substantially reduced. The compounds are therefore also preferentially suitable for use on grain which is being grown in the immediate vicinity of sensitive crops.

The following examples illustrate the preparation and mode of action of the compounds according to the invention in more detail.

EXAMPLE 1

8 g. of 3-phenyl-4,6-dichloropyridazine of melting point 101° to 103° C., which was obtained by reaction of 3-phenyl-4-chloro-pyridazone-(6) with phosphorus oxychloride ($POCl_3$) in a known manner, was suspended in 50 ml. of water, 3.5 g. of sodium hydroxide was added and the mixture was boiled under a reflux condenser. After about 2 hours a clear solution was produced. The mixture was allowed to continue to react for a further 30 minutes and was then cooled to 40° C., and filtered, the filtrate was acidified with hydrochloric acid and the finely crystalline product was filtered off, washed with water and recrystallized from ethanol.

Yield, 6.4 g. of 3-phenyl-4-hydroxy-6-chloropyridazine, corresponding to 87.5% of theory. Melting point: decomposition from 220° C. onwards.

Calculated (percent): C, 58.12; H, 3.41; N, 13.56; Cl, 17.16; O, 7.74. Found (percent): C, 58.2; H, 3.5; N, 13.5; Cl, 17.3; O, 7.7.

EXAMPLE 2

1.15 g. of sodium was dissolved in 50 ml. of methanol and this solution was added dropwise to a suspension of 11.4 g. of 3-phenyl-4,6-dichloro-pyridazine in 50 ml. of methanol, the mixture was then boiled for 30 minutes under a reflux condenser, cooled and filtered, the filtrate was evaporated, the residue was stirred with water and the crystals were filtered off and recrystallized from methanol.

Yield 8.3 g. of 3-phenyl-4-methoxy-6-chloro-pyridazine, corresponding to 75.5% of theory. Melting point: 125° to 126° C.

Calculated (percent): C, 59.87; H, 4.11; N, 12.70; Cl, 16.07; O, 7.25. Found (percent): C, 59.6; H, 4.0; N, 12.6; Cl, 15.9; O, 7.6.

EXAMPLE 3

10 g. of 3-phenyl-4,6-dibromopyridazine of melting point 142° to 144° C., which was obtained by reaction of 3-phenyl-4-chloropyridazone-(6) with $PBr_5$, was suspended in 100 ml. of water, 3.0 g. of sodium hydroxide was added and the mixture was boiled for 2½ hours under a reflux condenser, cooled to 40° C. and filtered, the filtrate was acidified with dilute hydrochloric acid and the fine crystals were filtered off, washed with water and recrystallized from ethanol.

Yield 6.4 g. of 3-phenyl-4-hydroxy-6-bromopyridazine, corresponding to 80% of theory. Melting point: decomposition from 215° C. onwards.

Calculated (percent): C, 47.83; H, 2.81; N, 11.16; Br, 31.82; O, 6.37. Found (percent): C, 48.0; H, 2.9; N, 11.1; Br, 31.2; O, 6.7.

EXAMPLE 4

5 g. of 3-phenyl-4-hydroxy-6-chloropyridazine was boiled with 20 ml. of acetic anhydride for 2 hours, the reaction solution was evaporated in vacuo, the residue was extracted with ether, the ether was evaporated off and the oily crude produce was distilled in vacuo.

Yield: 3.4 g. of 3-phenyl-4-acetoxy-6-chloropyridazine, corresponding to 56.7% of theory. Boiling point$_{0.1}$: 172° to 175° C.

Calculated (percent): C, 57.96; H, 3.65; N, 11.72; Cl, 14.26; O, 12.87. Found (percent): C, 58.0; H, 3.7; N, 11.2; Cl, 14.0; O, 13.0.

EXAMPLE 5

20 parts of 3-phenyl-4-hydroxy-6-chloropyridazine was mixed with 75 parts of kaolin and 5 parts of sodium oleylmethyl-tauride in a mechanical grinding and mixing device and ground until a homogeneous dust of the desired particle size was obtained. The spray liquor obtained by stirring the formulation in water was applied to the plants by spraying.

EXAMPLE 6

50 parts of 3-phenyl-4-methoxy-6-chloropyridazine, 35 parts of clay powder, 10 parts of ligninsulphonate and 5 parts of sodium oleyl-methyl-tauride were mixed in a mechanical grinding and mixing device and ground until the desired particle size was obtained. The mixture thus obtained may be employed as a spraying powder.

EXAMPLE 7

20 parts of 3-phenyl-4-acetoxy-6-chloropyridazine, 70 parts of xylene and 10 parts of alkylarylsulphonate mixed with polyoxyethylene-sorbitane-tall oil ester were mixed. The emulsion concentrate thereby obtained gave a stable emulsion on being stirred into the amount of water required for application to the plant.

The examples which follow are intended to illustrate the action of the compounds according to the invention:

EXAMPLE 8

Weeds grown in a greenhouse,

*Galium aparine*—Cleavers
*Erodium cicutarium*—Stork's bill
*Centaurea jacea*—Knapweed
*Lapsana communis*—Nipplewort
*Anthemis arvensis*—Field camomile
*Lamium purpureum*—Deadnettle
*Stellaria media*—Chickweed
*Veronica hederaefolia*—Speedwell
*Galinsoga parviflora*—Field scabious
*Raphanus raphanistrum*—Jointed charlock were sprayed with a suspension of the compounds according to the invention after the weeds had reached the 4–6 leaf stage. The spray solution was manufactured by suspending a wettable powder consisting in each case of 20% by weight of the active substance in question. 70% by weight of kaolin and 10% by weight of the dispersing agent sodium oleyl-methyl-tauride. The dosage corresponded to 2 kg. of the active compound per hectare. 14 days after the treatment, the herbicidal effect on the weeds was determined in accordance with the E.W.R.C. Rating Scheme (E.W.R.C.=European Weed Research Council). The ratings 1 to 9 correspond to the following rates of destruction or damage.

| Rating of the herbicidal action | Corresponding percent destruction of the weeds | Rating of damage to the crop plants | Corresponding to percent thinning-out or growth inhibition |
| --- | --- | --- | --- |
| 1 | 100 | 1 | 0 |
| 2 | 97.5 | 2 | 2.5 |
| 3 | 95 | 3 | 5 |
| 4 | 90 | 4 | 10 |
| 5 | 85 | 5 | 15 |
| 6 | 75 | 6 | 25 |
| 7 | 65 | 7 | 35 |
| 8 | 32.5 | 8 | 67.5 |
| 9 | 0 | 9 | 100 |

The results are summarized in Table I.

EXAMPLE 9

Crop plants grown in a greenhouse

*Triticum vulgare*—Wheat
*Hordeum sativum*—Barley
*Avena sativa*—Oats
*Secale cereale*—Rye
*Zea mays*—Maize
*Oryza sativa*—Rice
*Lolium multiflorum*—Italian ryegrass
*Phleum pratense*—Timothy
*Bea vulgaris*—Sugar beet
*Raphanus sativus* var. *radicula*—Radishes were sprayed with a suspension of the compounds according to the invention. At the point in time of the treatment, the varieties of grain, maize and rice had formed 3 leaves while the crop grasses (ryegrass and timothy) were in the tillering stage and the sugar beets and radishes had developed the first two genuine leaves in addition to the cotyledons. The spray solution was manufactured by suspending a wettable powder according to Example 8. The dosage corresponded to 5 kg. of the active compound per hectare. 14 days after the treatment, the degree of damage of the crop plants was determined in accordance with the E.W.R.C. Rating Scheme. The results are shown in Table I.

3 weeks after the treatment, the following herbicidal effect was found:

| Types of weed | Herbicidal effect in percent (corresponding E.W.R.C. ratings in parentheses) 3-phenyl-2-hydroxy-6-chloropyridazine | |
|---|---|---|
| | 2 kg./ha. | 4 kg./ha. |
| Galium aparine | 100 (1) | 100 (1) |
| Lamium purpureum | 100 (1) | 100 (1) |
| Veronica hederaefolia | 100 (1) | 100 (1) |
| Veronica persica | 100 (1) | 100 (1) |
| Capsella bursa pastoris | 100 (1) | 100 (1) |
| Senecio vulgaris | 80 (6) | 100(1) |
| Cerastium glomeratum | 100 (1) | 100 (1) |
| Stellaria media | 95 (3) | 99(2) |
| Anthemis arvensis | 100 (1) | 100 (1) |

The result of this experiment shows that the compound 3-phenyl-4-hydroxy-6-chloropyridazine is a herbicide of broad activity, which exerts an excellent effect against a series of the most diverse weeds.

EXAMPLE 11

A part of an experimental plot of open ground, which were used for growing winter wheat of "Hubertus" variety and on which also the weeds, named in the following table were growing was sprayed with a suspension of a spraying powder containing 70% of 3-phenyl-4-hydroxy-6-chloropyradazine (spray 1). The second part of the plot was sprayed with an emulsion of a mixture of 3-phenyl-4-hydroxy-6-chloropyridazine and a paraffinic mineral oil

TABLE I

| No. in Formula I | | Results of Example 8—Herbicidal action (ratings 1-9) | | | | | | | | | |
|---|---|---|---|---|---|---|---|---|---|---|---|
| R | X | Erodium cicut. | Centaurea jacea | Lapsana com. | Galium apar. | Anthemis arv. | Lamium purp. | Stellaria media | Veronica hed. | Calinsoga parv. | Raphanus raph. |
| H | Cl | 1 | 1 | 1 | 1 | 1 | 1 | 1 | 1 | 1 | 1 |
| CH$_3$ | Cl | 1 | 1 | 4 | 5 | 4 | 5 | 4 | 5 | 2 | 2 |
| COCH$_3$ | Cl | 1 | 1 | 1 | 1 | 1 | 1 | 1 | 1 | 1 | 1 |
| H | Br | 1 | 1 | 1 | 1 | 1 | 1 | 1 | 1 | 1 | 1 |

| No. in Formula I | | Results of Example 9—Damage to crop plants (ratings 1-9) | | | | | | | | |
|---|---|---|---|---|---|---|---|---|---|---|
| R | X | Triticum vulg. | Hordeum sat. | Avena sat. | Secale cer. | Zea mays | Oryza sat. | Lolium multifl. | Phleum prat. | Beta | Raphanus sat. |
| H | Cl | 1 | 1 | 1 | 1 | 1 | 1 | 2 | 2 | 9 | 9 |
| CH$_3$ | Cl | 1 | 1 | 1 | 1 | 1 | 1 | 3 | 3 | 7 | 8 |
| COCH$_3$ | Cl | 1 | 1 | 1 | 1 | 1 | 1 | 1 | 1 | 7 | 8 |
| H | Br | 1 | 1 | 1 | 1 | 1 | 1 | 1 | 2 | 8 | 8 |

EXAMPLE 10

A suspension of the compound 3-phenyl-4-hydroxy-6-chloropyridazine, in an amount corresponding to 2 kg. and 4 kg. of active substance per hectare, was sprayed, on 2 m.² experimental plots of open ground, onto a growth of the following weeds:

*Galium aparine*—Cleavers
*Lamium purpureum*—Deadnettle
*Veronica hederaefolia*—Ivy-leaved speedwell
*Veronica persica*—Persian speedwell
*Capsella bursa pastoris*—Shepherd's purse
*Senecia vulgaris*—Groundsel
*Cerastium glomeratum*—Broad-leaved mouse-ear
*Stellaria media*—Chickweed
*Anthemis arvensis*—Jointed charlock (spray 2). In both cases 2.4 kg. active compound per hectare were used and the amount of paraffinic mineral oil in spray 2 was 2.0 l. per hectare. At the time of spraying the winter wheat was in the stage of tillering and the weeds had developed 4 to 10 leaves. 3 weeks after the treatment the herbicidal effect was determined.

| | Percent destruction of the weeds | |
|---|---|---|
| | Spray 1 | Spray 2 |
| Galium aparine | 90 | 100 |
| Stellaria media | 87 | 100 |
| Viola tricolor | 90 | 95 |
| Anthemis arvensis | 65 | 85 |
| Matricaria chamomilla | 70 | 97 |
| Veronica hederaefolia | 90 | 100 |
| Lamium purpureum | 95 | 100 |
| Sinapis arvensis | 85 | 95 |
| Polygonum convolvulus | 85 | 98 |

What we claim is:
1. A phenylpyridazine of the formula

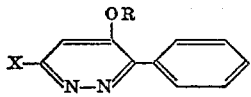

(I)

in which X is selected from the group consisting of chlorine and bromine and R is selected from the group consisting of hydrogen, methyl- and acetyl.
2. The phenylpyridazine according to claim 1 3-phenyl-4-hydroxy-6-chloropyridazine.
3. The phenylpyradazine according to claim 1 3-phenyl-4-methoxy-6-chloropyridazine.
4. The phenylpyridazine according to claim 1 3-phenyl-4-hydroxy-6-bromopyradazine.
5. The phenylpyradizane according to claim 1 3-phenyl-4-acetoxy-6-chloropyradazine.

References Cited
UNITED STATES PATENTS

| | | | |
|---|---|---|---|
| 3,137,696 | 6/1964 | Reicheneder | 260—250 |
| 3,323,892 | 6/1967 | Reicheneder | 260—250 |
| 3,326,660 | 6/1967 | Reicheneder | 71—2.5 |
| 3,550,026 | 1/1971 | Reicheneder | 260—250 |

NICHOLAS S. RIZZO, Primary Examiner
R. D. McCLOUD, Assistant Examiner

U.S. Cl. X.R.
71—92